United States Patent [19]
Lee et al.

[11] Patent Number: 5,771,139
[45] Date of Patent: Jun. 23, 1998

[54] INTEGRATED SPRING HEAD/GIMBAL ASSEMBLY HOLDER

[75] Inventors: Patrick R. Lee, San Diego; Arthur J. Cormier, Rancho Santa Fe, both of Calif.

[73] Assignee: Phase Metrics, San Diego, Calif.

[21] Appl. No.: 511,075

[22] Filed: Aug. 3, 1995

[51] Int. Cl.$^6$ ............................................. G11B 5/48
[52] U.S. Cl. .......................... 360/109; 360/103; 360/106
[58] Field of Search ........................... 73/866.5, 865.9, 73/865.8; 360/109, 104, 105, 107, 106, 103, 31, 137; 324/210, 212

[56] References Cited

U.S. PATENT DOCUMENTS

| | | | |
|---|---|---|---|
| 3,022,494 | 2/1962 | Hansen et al. | 360/109 |
| 4,017,898 | 4/1977 | Toombs et al. | 360/105 |
| 4,286,358 | 9/1981 | Levin | 24/67 R |
| 4,364,272 | 12/1982 | Daniel et al. . | |
| 4,415,137 | 11/1983 | Garves | 248/629 |
| 4,416,144 | 11/1983 | Chen et al. | 73/150 R X |
| 4,423,449 | 12/1983 | Hasegawa | 360/106 |
| 4,504,871 | 3/1985 | Berwick et al. | 360/31 |
| 4,709,281 | 11/1987 | Inoue et al. | 360/99.02 |
| 4,793,815 | 12/1988 | Lilov et al. | 439/77 |
| 4,803,578 | 2/1989 | Fujiwara et al. | 360/105 |
| 4,902,971 | 2/1990 | Guzik et al. | 324/212 |
| 4,912,583 | 3/1990 | Hinlein | 360/104 |
| 4,947,275 | 8/1990 | Hinlein | 360/104 |
| 4,995,816 | 2/1991 | Grabbe | 439/71 |
| 5,097,588 | 3/1992 | Fird et al. | 29/603 |
| 5,115,363 | 5/1992 | Khan et al. | 360/104 |
| 5,247,493 | 9/1993 | Kime et al. | 369/13 |
| 5,254,946 | 10/1993 | Guzik | 324/262 |
| 5,257,255 | 10/1993 | Morimoto et al. | 369/53 |
| 5,280,340 | 1/1994 | Lacey | 356/357 |
| 5,289,327 | 2/1994 | Suda | 360/109 |
| 5,339,702 | 8/1994 | Viches | 73/865.9 |
| 5,371,939 | 12/1994 | Ressmeyer et al. | 360/104 X |

FOREIGN PATENT DOCUMENTS

| | | | |
|---|---|---|---|
| 342625 | 11/1989 | European Pat. Off. | 360/109 |
| 0 598 593 | 5/1994 | European Pat. Off. . | |
| 134751 | 5/1989 | Japan | 360/109 |
| 114224 | 5/1993 | Japan | 360/109 |
| 28798 | 2/1994 | Japan | 360/109 |
| 70-06561 | 1/1995 | Japan . | |
| 1236546 | 6/1986 | U.S.S.R. | 360/109 |
| 2221786 | 2/1990 | United Kingdom | 360/109 |

OTHER PUBLICATIONS

*IBM Technical Disclosure Bulletin* vol. 11, No. 4, Sep. 1968, p. 362 "Clamping of Read–Write Heads" by C. P. Barnard.
*IBM Technical Disclosure Bulletin* vol. 18, No. 2, Jul. 1975, p. 543 "Adjustable Suspension Mount for Head Assembly" by R. B. Watrous.
*IBM Technical Disclosure Bulletin*, vol. 27, No. 10A, Mar. 1985 pp. 5652–5653 "Method of Checking Magnetic Head".
*Research Disclosure*, May 1989, No. 301, Kenneth Mason Publications, Ltd. 30188 "Adjustable Height Head Positioner for Test Mechanisms".
Anonymous, "Rotary Actuator Comb with Removable Arms", *IBM Technical Disclosure Bulletin*, vol. 35, No. 5, Oct. 1992, pp. 74–75.
Sales Brochure; ProQuip FM8801; publication date unknown. But by Jan. 1996 4 pages.
Sales Brochure; PPL Automatic Digital Flying Height Tester; publication date unknown. But by Jan. 1996 6 pages.
Sales Brochure; Dynamic Flying Height Tester; Phase Metrics; 6 pages; publication date unknown. But by Jan. 1996.

*Primary Examiner*—Thomas P. Noland
*Attorney, Agent, or Firm*—Dennis H. Epperson

[57] ABSTRACT

An integrated spring head/gimbal assembly holder is used to precisely load and unload a head/gimbal assembly (HGA) of the type used in magnetic disk drives. The holder includes a fixture base by which the holder is mounted. A first boss extending from the fixture base has a surface in which a recess is formed. The recess receives a second boss on the end of the HGA so that HGA rests on the surface of the first boss. A cantilevered beam extends from the fixture base and serves as a spring which includes a clamping head. Flexure of the cantilevered beam forces the clamping head to drive the second boss firmly against the sidewalls at the edge of the recess and to force the HGA against the surface of the boss. Thus, the HGA is precisely positioned and secured to the holder.

23 Claims, 7 Drawing Sheets

INTEGRATED SPRING HEAD/GIMBAL ASSEMBLY HOLDER

FIELD OF THE INVENTION

The present invention relates in general to test fixtures for head/gimbal assemblies and, more particularly, to a fixture for mounting and demounting a magnetic recording head/gimbal assembly to a test fixture.

BACKGROUND OF THE INVENTION

The rapid increase in the operating speed of computers has led to significant demands on both data storage capacity and access speed. The magnetic hard disk drive has been steadily evolving and continues to offer a cost-effective solution towards satisfying these demands. Increases in data storage densities and miniaturization of disk drives have enabled even small portable computers to have access to large amounts of on-line disk storage.

Air bearing type magnetic recording transducer assemblies are used extensively in magnetic disk drives and are generally referred to as head/gimbal assemblies (HGA). An HGA is typically comprised of a slider, which may incorporate one or more magnetic transducers, mounted to the end of a specially designed beam which is cantilevered from a support base. The slider rides on a film of air in a closely spaced, noncontact relationship next to a magnetic recording disk which rotates at relatively high speed.

In disk drives, head-to-media speeds are such that an air bearing is generated between the slider and the rotating disk. The distance, or flying height between the slider and the disk depends upon disk speed and the aerodynamics of the slider design. Since the closer the slider flies the better the drive performance, it is, therefore, important for disk drive manufacturers to know the flying height characteristics of the HGA's employed in their drives. The present trend is for reduced flying heights to accommodate the demand for ever increasing magnetic disk data storage densities. For example, flying heights of 250 angstroms are now common. In order to assure the reliability of disk drives, the sliders must be tested. In a mass production environment, such testing involves repeatedly mounting and demounting a series of HGA's onto a test fixture. Because of the dimensional requirements, the accuracy and repeatability of the fixture which holds the HGA is critical.

Presently, HGA's are mounted to a test fixture in a variety of ways. One technique uses a pivoting gripper. To load the HGA, the pivot is rotated in a first direction, say clockwise, and the HGA is placed on the tool mount. The pivoting gripper is then released and springs rotate the pivoting gripper counter clockwise so that the pivoting gripper engages the base of the HGA, thereby holding it securely on the tool mount for testing. A second technique uses a screw mount. The HGA is positioned on the tool mount and a screw is inserted through a hole in the boss of the HGA thereby securely fastening the HGA to the tool mount. However, changing the HGA usually takes longer because removing and replacing the screw is more time consuming than simply disengaging and engaging a separate gripper. A third technique uses a translating gripper as shown in FIG. 1 and described below.

Figure 1:
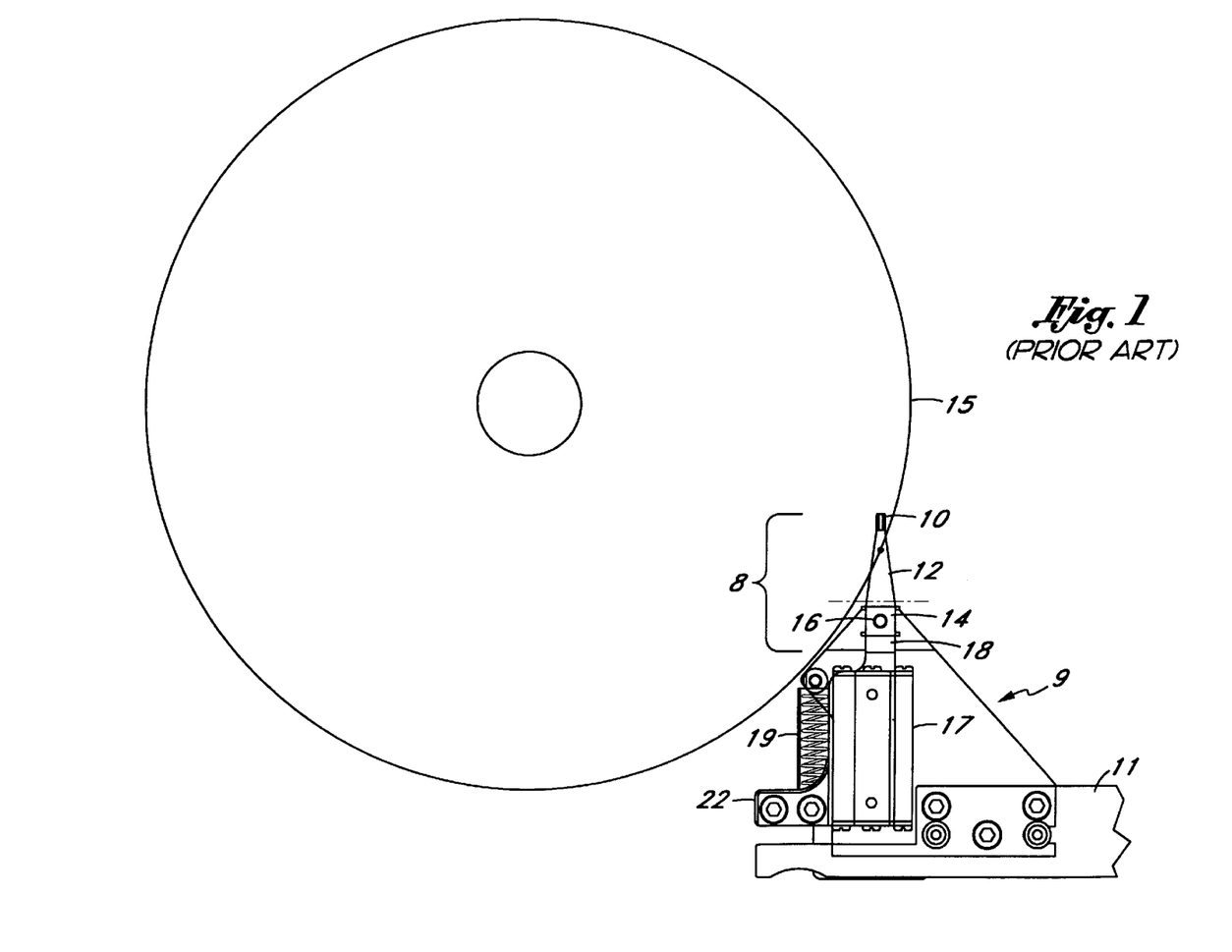
FIG. 1 illustrates a head/gimbal assembly (HGA) mounted in a prior art head/gimbal assembly holder.

FIG. 1 shows a typical head/gimbal assembly (HGA) 8 loaded in a prior art HGA holder 9 which in turn is mounted on a loading arm 11. HGA 8 generally is comprised of a slider 10 mounted to the end of a specially designed beam 12 which in turn, is cantilevered from a base support 14. A circular boss 16 extends from the base support 14 into the holder 9. The HGA holder 9, manufactured by Phase Metrics, of San Diego, Calif., Model No. 30562-H, is shown positioned next to a reference disk 1 5, and includes a sliding mechanism 17 having a clamping jaw 18 which transmits a force, provided by a spring 19, against the base 14 to secure the HGA 8 in the holder 9.

Figure 2:
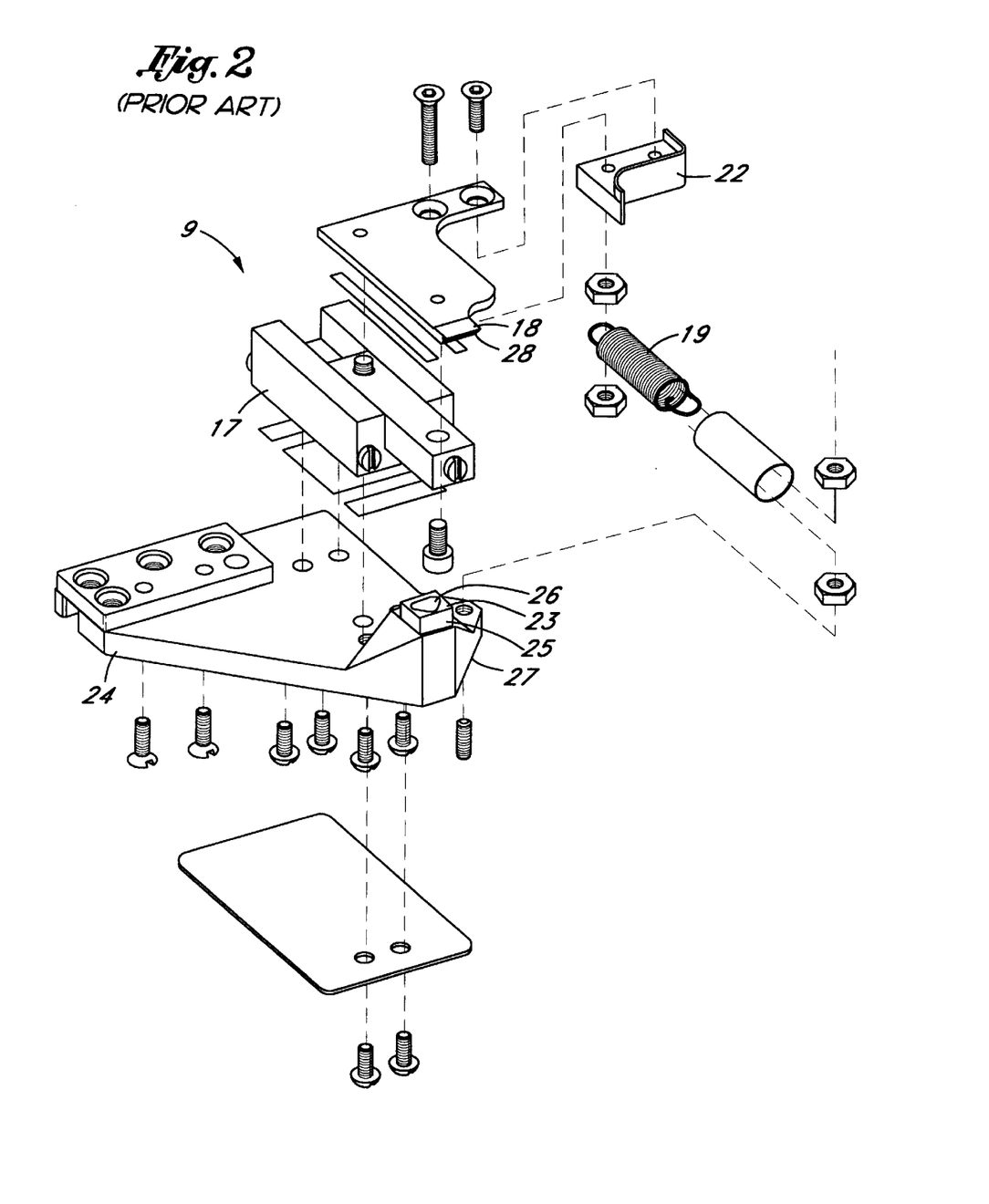
FIG. 2 is an exploded view of the head/gimbal assembly shown in FIG.

Referring now to FIG. 2, there is shown an exploded view of the holder 9 shown to be comprised of numerous components, including fixture base 24 having a boss 25 with a planar surface 23 from which an aperture 26 extends towards the opposite surface 27 of the fixture base 24. The aperture 26 has a generally triangularly shaped cross-sectional area with sides that taper outwardly as the aperture 26 extends from the planar surface 23 towards the opposite surface 27 of the fixture base 24.

In operation, HGA 8 is loaded onto the holder 9 by pulling back on handle 22 attached to the sliding mechanism 17, causing spring 19 to extend, and the clamping jaw 18 to be pulled away from the planar surface 23. The boss 16 (FIG. 1) of HGA 8 is positioned into aperture 26 until the base support 14 rests on the planar surface 23. Pressure on the handle 22 is then released, whereupon a tapered surface 28 of the clamping jaw 18, which is attached to the sliding mechanism 17, is forced against the edge of the base support 14 of the HGA 8. The force provided by the extended spring 19 also forces the boss 16 of HGA forward against the periphery of the aperture 26 at the planar surface 23, thereby securing and precisely positioning the HGA 8 to the holder 9. Unloading the HGA 8 is accomplished simply by pulling back on the handle 22 and then lifting the HGA out of the aperture 26 and away from the holder 9.

One limitation of holder 9 is that the longitudinal axis of the spring 19 is not coincident with the longitudinal center of the HGA 8. Therefore, the sliding mechanism 17 is subjected to a torque when contacting an HGA, resulting in possibly less precise positioning of HGA 8 in the holder 9. Furthermore, as is evident by FIG. 2, the holder 9 has a myriad of separate components which must all be manufactured and assembled to very tight tolerances, and is therefore expensive to manufacture. Therefore, a need exists for a head/gimbal assembly holder which has fewer parts, is less expensive to manufacture, and which can more precisely position a head/gimbal assembly over a longer period of time than does the type of holder depicted in FIGS. 1 and 2.

SUMMARY OF THE INVENTION

The present invention provides an integrated spring head/gimbal assembly holder that is used to precisely mount and demount a head/gimbal assembly (HGA) of the type used in magnetic disk drives to a test fixture. The holder includes a fixture base by which the holder is mounted. A mounting platform on the fixture base has a planar surface in which a recess is formed. The recess receives a boss on the HGA so that the end of the HGA slider rests on the planar surface of the mounting platform. A cantilevered beam extends from the fixture base and serves as a spring that supports a clamping head. Flexure of the cantilevered beam forces the clamping head to drive the HGA boss firmly against the edge of the sidewalls of the recess, thereby securing and precisely positioning the HGA to the holder. The holder may also include a release lever extending from the cantilevered spring to facilitate flexure of the cantilevered beam when mounting and demounting the HGA from the holder.

An important advantage of the present invention is that it may be fabricated as a single, monolithic structure having no rotating, sliding, or pivoting mechanisms. Another advantage of the invention is that the magnitude and direction of the clamping force can be easily and precisely set by size and shape of the integrated spring. Furthermore, the invention may be inexpensively manufactured using standard electrical discharge machining (EDM) techniques.

In a first embodiment, the invention is an integrated spring head/gimbal assembly holder, comprising: a fixture base; a boss extending from the fixture base and having a surface into which a recess extends; a cantilevered beam extending from the fixture base; and a clamping head extending from the cantilevered beam. This embodiment may further include a release lever extending from the cantilevered beam towards the fixture base. Additionally, the recess formed in the boss of the fixture base may include sidewalls which slope outwardly towards the fixture base. In some configurations, the recess has a generally triangular cross-sectional area. In an alternate embodiment, the clamping head extends from a first region of the cantilevered beam, and the release lever extends from the first region of the cantilevered beam towards the fixture base. In a further embodiment, the clamping head has a clamping surface which defines an angle with respect to the surface. In some embodiments, the cantilevered beam has a serpentine shape. In yet a further embodiment, the fixture base, cantilevered beam, and clamping head comprise a monolithic structure. The monolithic structure may further comprise stainless steel. In some embodiments, the stainless steel has a Rockwell hardness in the range of about 50–60.

In a second embodiment the invention is embodied as an integrated spring head/gimbal assembly holder, comprising: a fixture base; a boss extending from the fixture base and having a surface; an aperture extending from the surface towards the fixture base; a cantilevered beam extending from the fixture base; and a clamping head extending from the cantilevered beam. This embodiment may further include a release lever extending from the cantilevered beam towards the fixture base. Additionally, the aperture includes sidewalls which slope outwardly from the surface towards the fixture base. In some configurations, the aperture has a generally triangular cross-sectional area. In an alternate embodiment, the clamping head extends from a first region of the cantilevered beam, and the release lever extends from the first region of the cantilevered beam towards the fixture base. In a further embodiment, the clamping head has a clamping surface which defines an angle with respect to the surface. In some embodiments, the cantilevered beam has a serpentine shape. In yet a further embodiment, the fixture base, cantilevered beam, and clamping head comprise a monolithic structure. The monolithic structure may further comprise stainless steel. In some embodiments, the stainless steel has a Rockwell hardness in the range of about 50–60.

In a third embodiment the invention is an integrated spring head/gimbal assembly holder for holding a head/gimbal assembly having a base section and a boss extending from the base section, the holder comprising: a fixture base; a boss extending from the fixture base and having a surface for supporting the base section; a recess extending from the surface towards the fixture base for receiving the boss; a cantilevered beam extending from the fixture base; and a clamping head extending from the cantilevered beam for forcing the base section against the recess. This embodiment may further include a release lever extending from the cantilevered beam towards the fixture base. Additionally, the recess may include sidewalls which slope outwardly towards the mounting surface. In some configurations, the recess has a generally triangular cross-sectional area. In an alternate embodiment, the clamping head extends from a first region of the cantilevered beam, and the release lever extends from the first region of the cantilevered beam towards the fixture base. In a further embodiment, the clamping head has a clamping surface which defines an angle with respect to the surface. In some embodiments, the cantilevered beam has a serpentine shape. In yet a further embodiment, the fixture base, cantilevered beam, and clamping head comprise a monolithic structure. In yet a further embodiment, the recess forms an aperture. Additionally, the surface may be a planar surface.

In a fourth embodiment, the invention is a device for holding an HGA having a mounting base, the device comprising: a base having a support region which is configured to receive the HGA mounting base; and a cantilevered beam extending from the base and rigidly attached to the base at a first region such that a second region of the cantilevered beam is capable of flexing with respect to the base thereby acting as a spring, wherein the cantilevered beam further comprises a clamping region configured to engage the HGA mounting base. This embodiment may further comprise a release lever extending from the cantilevered beam towards the base. Additionally, the cantilevered beam may have a serpentine shape. In a further embodiment, the base, cantilevered beam, and clamping region comprise a monolithic structure.

These and other characteristics of the present invention will become apparent through reference to the following detailed description of the preferred embodiments and accompanying drawings, including the claims, in which like reference numerals refer to like parts.

DETAILED DESCRIPTION OF THE PREFERRED EMBODIMENTS

Figure 3:
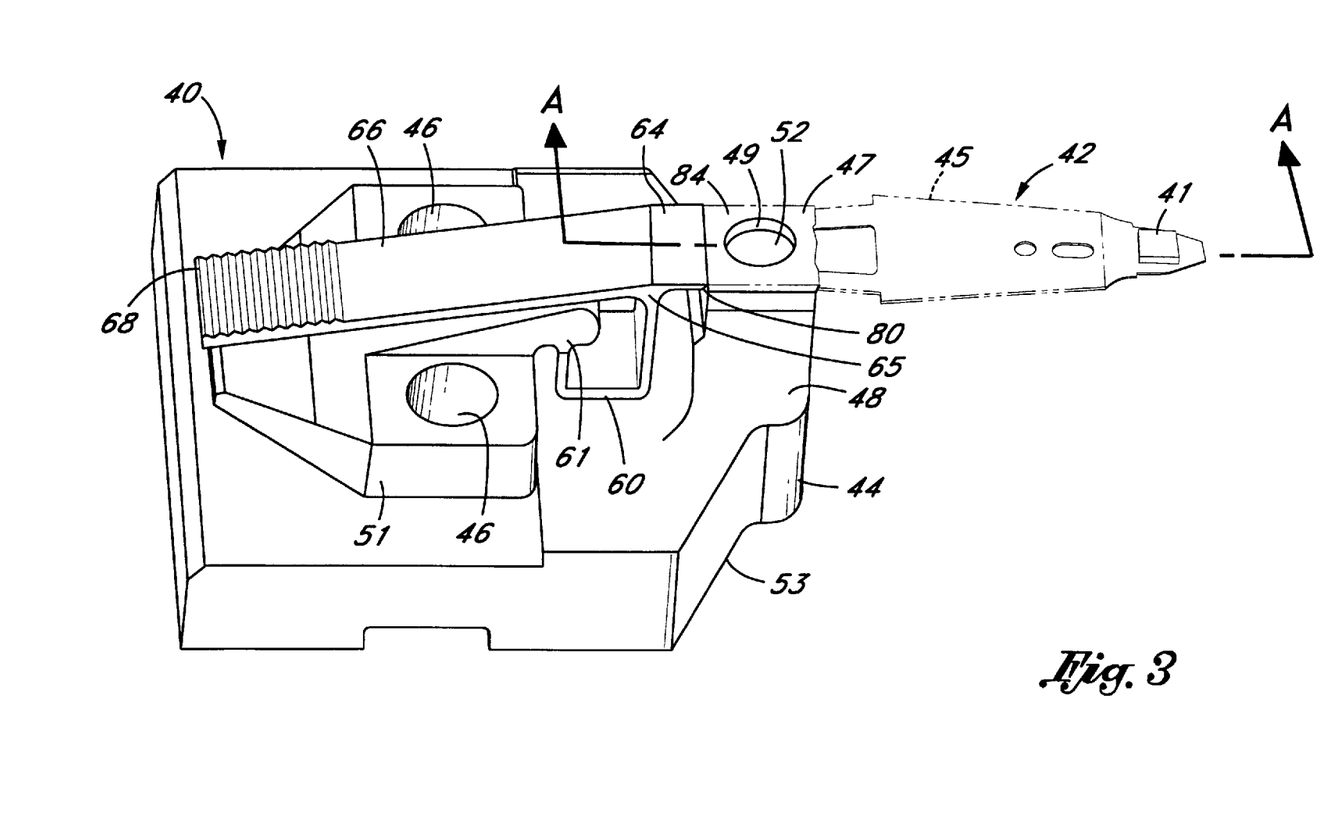
FIG. 3 shows a perspective view of an HGA mounted in an integrated spring head/gimbal assembly holder embodying various features of the present invention.
Figure 4:
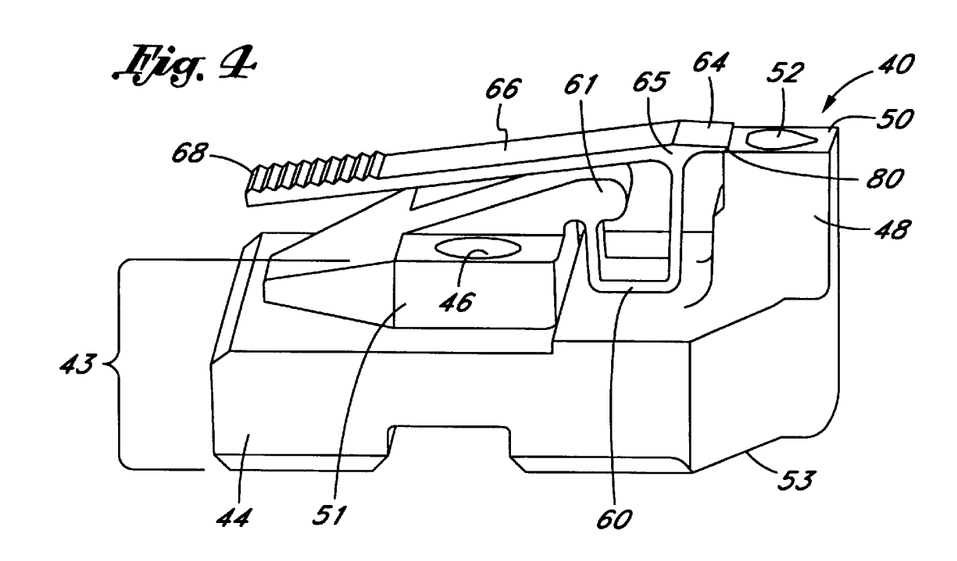
FIG. 4 shows the integrated spring head/gimbal assembly holder of FIG. 3 without the HGA.

In FIG. 3 there is shown an integrated spring head/gimbal assembly holder (hereinafter "holder") 40 embodying various features of the present invention for securely holding and precisely positioning a head/gimbal assembly (HGA) 42. One well known type of HGA 42 particularly suitable for use in conjunction with the present invention is Hutchinson Technology, Inc., Part No. 1650 combined with a slider 41 mounted to an end of a cantilevered beam 45 of Part No. 1650 that extends from a base support 47. A boss 49 typically in the form of a tube extends from the base support 47 and is intended to fit within a recess formed in the holder 40. Referring also now to FIG. 4, the holder 40 includes a fixture base 43 comprised of fixture base elements 44 and 51 which are affixed to each other, as for example, using threaded fasteners, not shown, fitted through apertures 46 formed in the fixture base element 51 and which engage the fixture base element 44. In the application of the holder 40, fixture base 43 provides a structure by which the holder 40 may be mounted to a loading arm assembly of the type shown in FIGS. 9 and 10. A boss or "chimney" 48 extends from the fixture base element 44 and includes a surface or platform 50 into which a recess 52 is formed. The surface 50 is preferably a planar surface since a planar surface conforms well to the contour of support base 47. In a preferred embodiment, the recess 52 is formed as an aperture extending from the surface 50 through to the opposite side 53 of the fixture base 43, specifically fixture base element 44. In an alternative construction, the fixture base 43 may be formed as a monolithic structure which integrates the separate features of the fixture base elements 44 and 51.

A cantilevered beam 60 extends from a region 61 of the fixture base element 51. A clamping head 64 extends from a flexure junction region 65 at the distal end of beam 60 to the edge of the surface 50 of the chimney, or boss 48. The clamping head 64 has a surface 80, also shown in FIG. 6, which defines an angle θ with respect to the surface 50 of the chimney 48.

Figure 6:
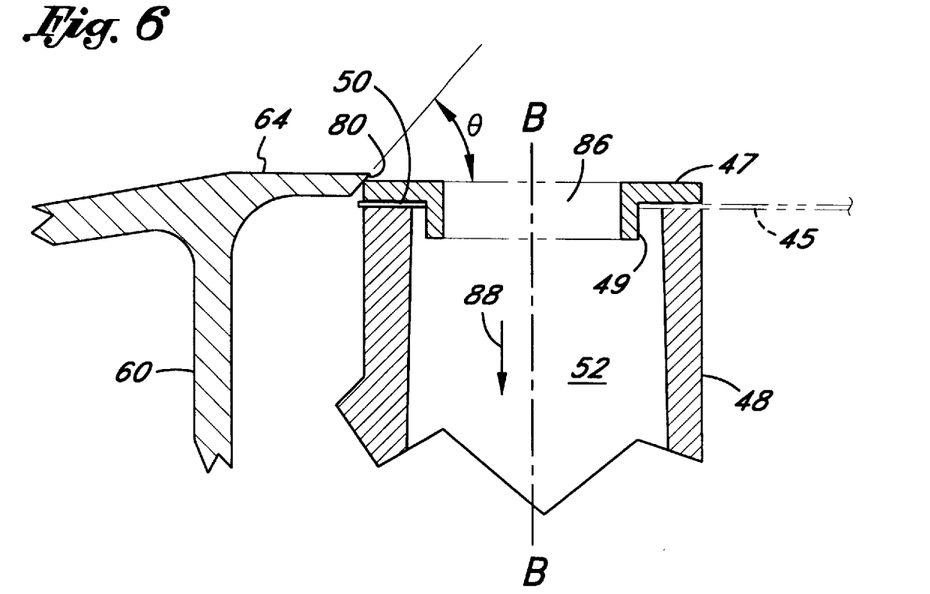
FIG. 6 is a cross-sectional view of section A—A of FIG. 3 showing details of the recess of the integrated spring HGA holder.

For example, such angle θ may be in the range of 30–60 degrees, and more preferably, at 45 degrees with respect to the surface 50 of the chimney 48. The cantilevered beam 60 serves as a resilient spring which provides a force by which the clamping head 64 may secure HGA 42 to the holder 40.

The holder 40 may also include, by way of example, a release lever 66 which extends at an angle from the junction region 65 of the beam 60 towards the fixture base 43. The release lever 66 facilitates deflection of the cantilevered beam when HGA 42 is loaded or unloaded from the holder 40. The release lever 66 preferably has a serrated end region 68 which provides a good frictional surface to facilitate manual manipulation of the lever 66 without slipping.

The beam 60 is shown, by way of example, as having a serpentine shape in the form of a truncated "U", although serpentine shapes such as "Z", "S", or others may also be used. An important advantage of a serpentine shape for the beam 60 is that it allows the overall height of the holder 40 to be reduced compared to the height of a holder having a straight cantilevered beam. The scope of the invention also includes the incorporation of a generally straight cantilevered beam, as exemplified by beam 112 of holder 100, shown in FIG. 5.

By way of example, the holder 40 may be manufactured as a monolithic structure, preferably from AISI 440C stainless steel having a Rockwell hardness in the range of 50–60. Stainless steel is a particularly advantageous material for this application because it has good corrosion resistance and may be tempered to a suitable hardness, which is important because it increases the yield strength. Additionally, the holder 40 may be manufactured using standard electrical discharge machining (EDM) techniques.

Figure 7:
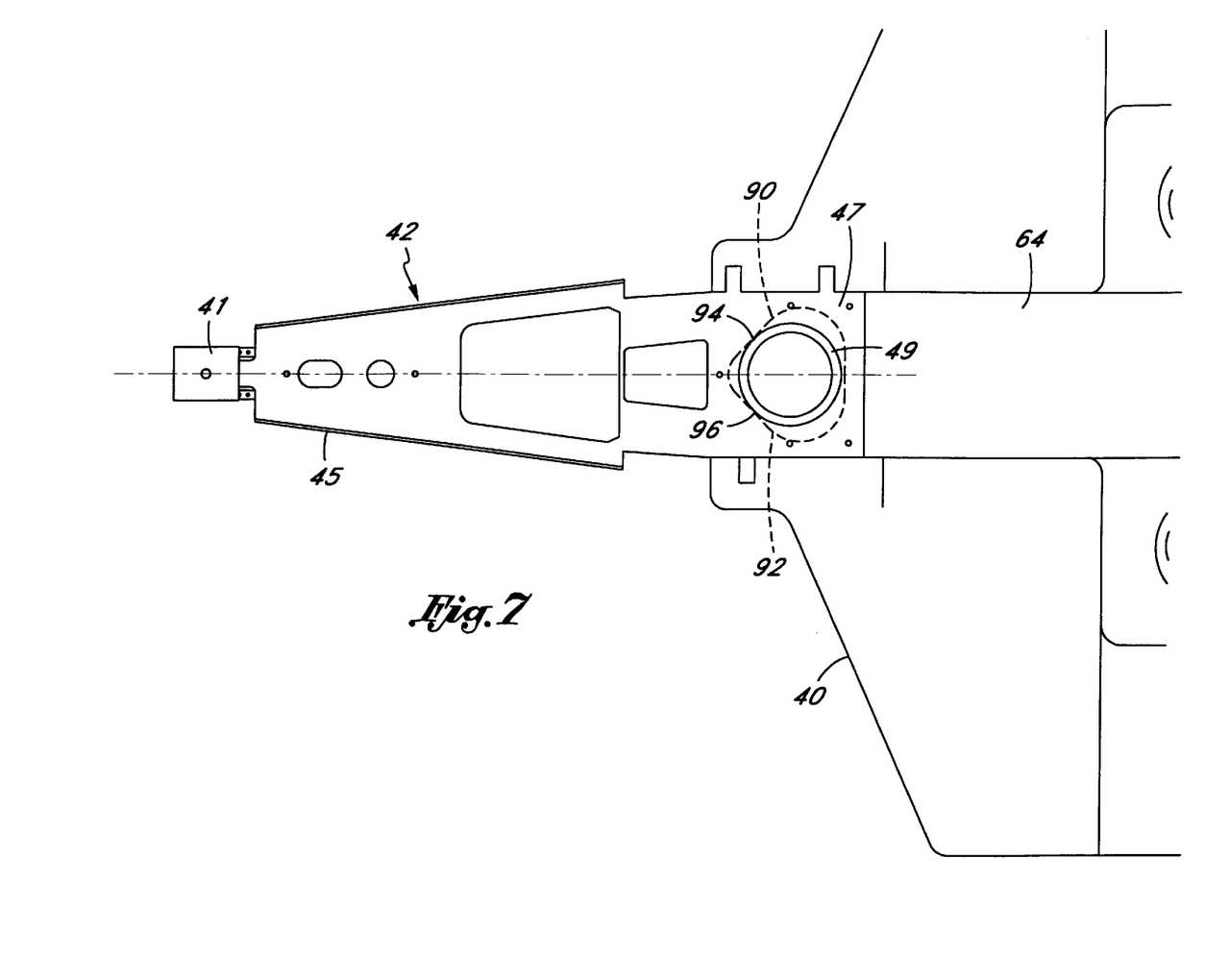
FIG. 7 is a plan view showing a boss on the head/gimbal assembly positioned in the recess of the integrated spring HGA holder.

Referring to FIG. 6, there is shown cross-sectional view A—A of FIG. 3 illustrating additional details of the recess 52 formed in the chimney 48. The recess 52 is preferably sloped, or tapered outwardly from its opening 86 so that its cross-sectional area increases about its longitudinal center axis B—B in the direction indicated by the arrow 88. The recess 52 may be defined by wall surfaces 90 and 92 shown in FIG. 7. In the preferred embodiment, the wall surfaces 90 and 92 serve as backstops against which the boss 49 extending from the base support 47 of HGA 42 is forced because the base support 47 of the HGA 42 is pushed by the surface 80 of clamping head 64 when HGA 42 is loaded in the holder 40. Since the recess 52 is tapered and the boss 49 of HGA 42 is generally circular, the boss 49 contacts the recess 52 where it intersects the surfaces 90 and 92, and at the edge of recess 52, i.e., essentially at two points 94 and 96, respectively. Two-point contact between the boss 49 of HGA 42 and the edge of recess 52 along with a line contact between the end of base support 47 of HGA 42 and the clamping head 64 provide very positive, precise, and repeatable positioning of HGA's 42 as they are loaded and unloaded from the holder 40.

Figure 8:
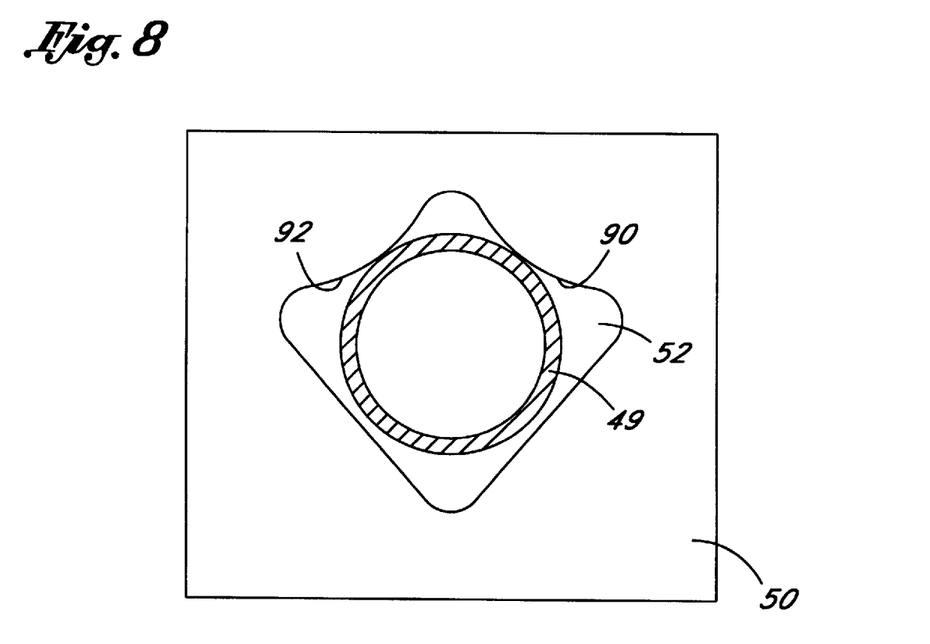
FIG. 8 shows the HGA boss situated in a recess having another configuration formed in the chimney of the integrated spring HGA holder.

As shown by way of example in FIG. 1, the recess 52 may have a generally triangular cross-sectional area. However, it is to be understood that other cross-sectional areas of the recess 52 may also be employed, such as a parallelogram, square, and the like. Furthermore, the surfaces 90 and 92 need not necessarily have planar regions as shown. The surfaces 90 and 92 may also have convex surfaces extending into the recess 52, as shown in FIG. 8, to preferably provide essentially point contact between the boss 49 and the recess 52. The chimney may also be formed as an aperture having sloped or tapered sidewalls and the cross-sectional characteristics of the recess 52.

The operation of the holder 40 is described with reference to FIGS. 3 and 4 collectively. HGA 42 is mounted to the holder 40 by applying force to the serrated end 68 of the release lever 66. Such force causes resilient flexure of the beam 60, thereby pulling the clamping head 64 away from the surface 50 of the chimney 48. Then, as shown in FIG. 3, the base support 47 of HGA 42 is placed on the surface 50 so that the boss 49 extending from the base support 47 is positioned within the recess 52. A human operator may then release pressure on the end 68 of the release lever 66 so that the resilient force of the cantilevered beam 60 causes the surface 80 of the clamping head 64 to apply a first force vector which drives the boss 49 of HGA 42 against the edge of recess 52, and a second force vector which drives the base support 47 against the surface 50. Thus, HGA 42 may be precisely positioned and securely mounted to the holder 40. Withdrawal of HGA 42 is simply and rapidly accomplished by applying force to the serrated end 68 of the release lever 66 so that the clamping head 64 is pulled away from the end 84 of HGA 42. HGA 42 may then simply be lifted away from the holder 40.

Figure 9:
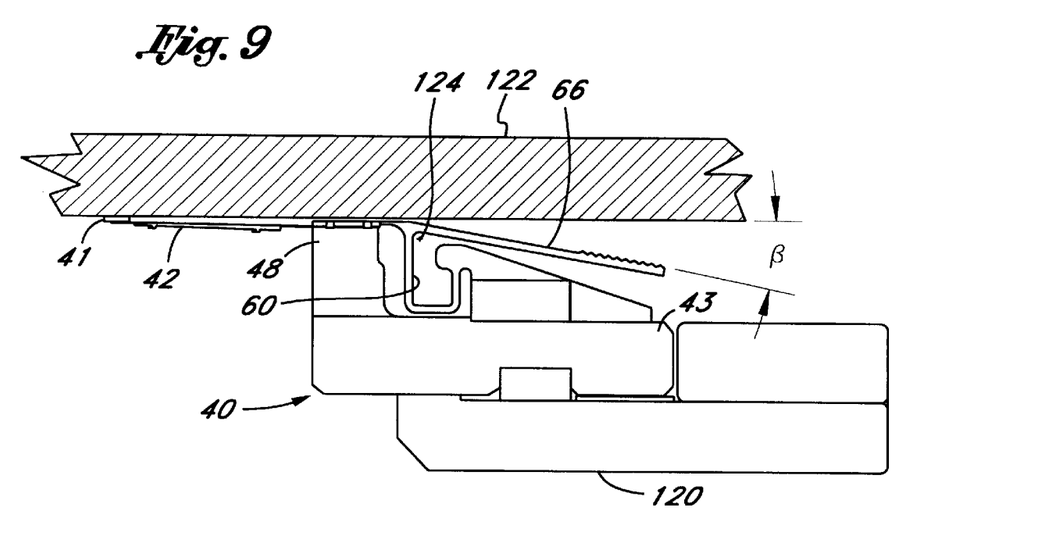
FIG. 9 is a side view of an HGA mounted to the integrated spring head/gimbal assembly of the present invention which is supported on a loading arm and which is rotated to flying height distance from a test disk.
Figure 10:
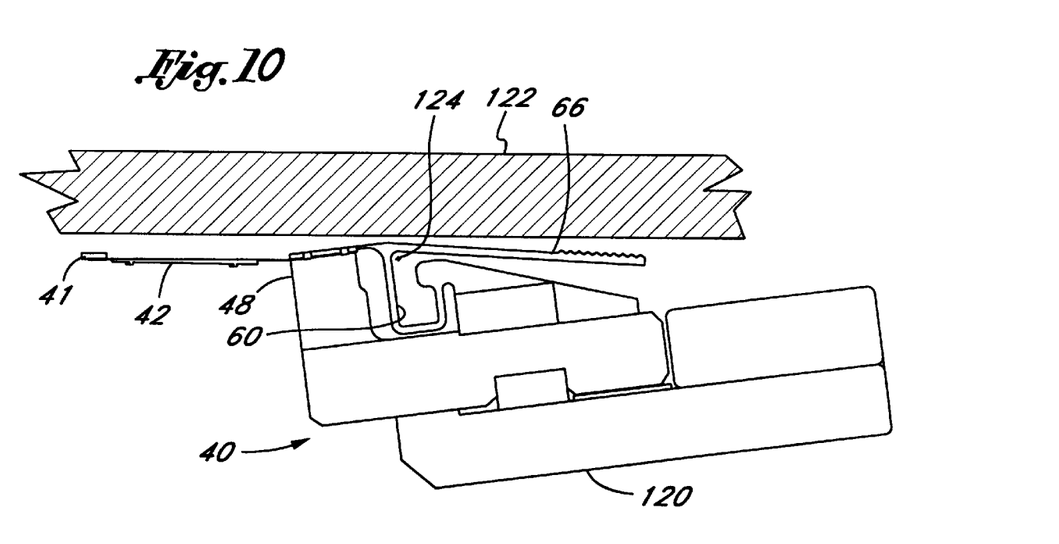
FIG. 10 shows the HGA of FIG. 9 rotated in an unload position away from a test disk.

A typical operational environment of holder 40 is described with reference to FIGS. 9 and 10. In FIG. 9, there is shown holder 40 mounted to a loading arm assembly 120. The slider 41 of HGA 42 is supported in the loaded position by the holder 40 with respect to glass disk 122. The loading arm assembly 120 rotates in an arcuate path so that the holder pivots about rotational axis 124. When slider 41 is situated in the loaded position, the lever release 66 extends at an angle β away from the glass disk 122. However, the lever release 66 does not contact the glass disk 122. In FIG. 10, the loading arm assembly is shown rotated about rotational axis 124 so that the slider 41 is in the unloaded position away from the surface of the glass disk 122. Rotation of the loading arm assembly 122 about the rotational axis 124 causes the angled release lever 66 to be positioned next to and slightly spaced away from the glass disk 122 along the length of the release lever 66. Thus, it may be appreciated that the angle of the release lever 66 provides the advantage of allowing the holder 40 to be rotated about the axis 124 without causing release lever 66 to contact the glass disk 122 when in the unloaded position.

Figure 5:
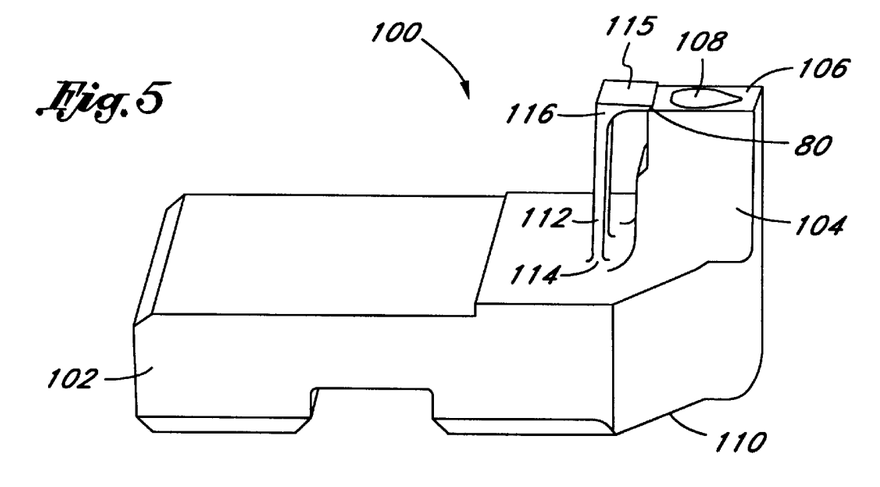
FIG. 5 shows another embodiment of an integrated spring head/gimbal assembly holder of the present invention.

Another embodiment of the present invention is illustrated in FIG. 5 which shows a holder 100 which includes a fixture base 102 from which a boss or "chimney" 104 extends. The chimney 104 has a preferably planar surface 106 into which a recess 108 is formed. In a preferred embodiment, the recess 108 is formed as an aperture extending from the planar surface 106 through to the opposite side 110 of the fixture base 102. A generally straight cantilevered beam 112 extends from a flexure region 114 of the fixture base 102. A clamping head 115 extends from a junction region 116 at the distal end of beam 112 towards the edge of the surface 106 of the chimney 104. The beam 112 may also be implemented with other shapes as well. For example, beam 112 may be serpentine shaped, as for example, "S" and "C" shaped. Although the holder 100 does not employ a structure equivalent to release lever 66, loading and unloading HGA 42 from the holder 100 may be accomplished by resiliently deflecting the beam 112 in accordance with the technique described above with reference to holder 40. Like holder 40, the holder 100 may be manufactured as a monolithic structure made, for example, of 440C AISI stainless steel having a Rockwell hardness in the range of 50–60.

While the present invention has been described in terms of preferred embodiments, it is to be understood that the invention is not to be limited to the exact form of the invention disclosed herein. Additionally, it will be understood that the apparatus and method of the present invention to mount and demount an HGA from a holding fixture may be employed with many types of devices including but not limited to flying height testers. For example, the present invention may also be incorporated in, but not limited to, hardness testers, electrical testers, drag testers, HGA resonance testers, disk certifiers, magnetoresistive head testers, start/stop testers and any other kind of equipment or machinery that requires that an HGA be mounted/demounted quickly in a controlled manner to/from a holding fixture. The apparatus and method of the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope. Therefore, it is to be understood that the invention may be practiced other than as specifically described without departing from the scope of the claims.

We claim:

1. A device for holding a Head/Gimbal Assembly (HGA), wherein the HGA comprises a slider mounted to a distal end of a support beam, wherein a proximate end of the support beam further includes a substantially planar HGA mounting region, the HGA mounting region further including a boss which extends from a surface of the substantially planar HGA mounting region of the support beam, said device comprising:

a base having a substantially planar support region which is configured to receive the substantially planar HGA mounting region, wherein said substantially planar support region of said base includes a recess formed therein which is configured such that the boss extending from the surface of the substantially planar HGA mounting region is insertable within said recess; and a cantilevered beam extending from said base and rigidly attached to said base at a first region of said cantilevered beam such that a second region of said cantilevered beam is capable of flexing with respect to said base thereby acting as a spring, wherein said cantilevered beam further comprises a clamping region configured to engage the HGA mounting region when the HGA boss is inserted in said base support region recess thereby securing the HGA mounting region of the HGA to said support region of said base.

2. A device as defined in claim 1 further comprising a release lever attached proximate to said second region of said cantilevered beam and extending from said second region of said cantilevered beam, wherein said release lever is configured such that a deflection of said release lever towards said base moves said cantilevered beam clamping region away from the HGA mounting region thereby releasing the HGA mounting region of the HGA from said support region of said base.

3. A device as defined in claim 2 wherein said base, said cantilevered beam, and said release lever comprise a monolithic structure.

4. A device as defined in claim 1 wherein said cantilevered beam has a serpentine shape.

5. A device as defined in claim 1 wherein said base support region recess is bound by sidewalls which slope outwardly from a surface of said substantially planar support region towards said base thereby defining a first transverse recess dimension at said surface of said substantially planar support region which is smaller than a second transverse recess dimension located at a position along said recess which is not at said surface of said substantially planar support region.

6. A device as defined in claim 1 wherein said recess has a generally triangular transverse cross-sectional shape.

7. A device as defined in claim 1 wherein said clamping region of said cantilevered beam further comprises a substantially planar clamping surface which defines an angle with respect to said surface of said substantially planar support region.

8. A Head/Gimbal Assembly (HGA) holder for holding an HGA having a slider attached to a distal end of a support beam and a substantially planar mounting section at a proximate end of the support beam, wherein the HGA mounting section has a boss extending from a surface of the substantially planar mounting section, said HGA holder comprising:

a base;

an HGA support platform extending from said base wherein said HGA support platform has a substantially planar support surface for supporting the substantially planar HGA mounting section and a recess formed in said HGA support platform configured to receive the boss extending from the surface of the HGA mounting section; and a cantilevered beam extending from said base, wherein a proximate end of said cantilevered beam is attached to said base such that a distal end of said cantilevered beam is capable of flexing with respect to said base thereby acting as a spring, said distal end of said cantilevered beam configured to contact the HGA mounting section positioned on said HGA support platform thereby holding the boss extending from the surface of the HGA mounting section against said HGA support platform recess.

9. A device as defined in claim 8 further comprising a release lever attached proximate to said distal end of said cantilevered beam and extending from said distal end of said cantilevered beam, wherein said release lever is configured such that a deflection of said release lever towards said base moves said distal end of said cantilevered beam away from the HGA mounting section thereby releasing the HGA mounting section from said HGA support platform of said base.

10. A device as defined in claim 9 wherein said base, said HGA support platform, said cantilevered beam, and said release lever comprise a monolithic structure.

11. A device as defined in claim 8 wherein said cantilevered beam has a serpentine shape.

12. A device as defined in claim 8 wherein said HGA support platform recess is bound by sidewalls which slope outwardly from a surface of said substantially planar support surface towards said base thereby defining a first transverse recess dimension at said substantially planar support surface which is smaller than a second transverse recess dimension located at a position along said recess which is not at said substantially planar support surface.

13. A device as defined in claim 8 wherein said HGA support platform recess has a generally triangular transverse cross-sectional shape.

14. A device as defined in claim 8 wherein said distal end of said cantilevered beam further comprises a substantially planar clamping surface which defines an angle with respect to said substantially planar support surface of said HGA support platform.

15. A Head/Gimbal Assembly (HGA) holder for holding an HGA having a slider attached to a distal end of a support beam and a substantially planar mounting section at a proximate end of the support beam, wherein the HGA mounting section has a boss extending from a surface of the substantially planar mounting section, said HGA holder comprising:

a base;

an HGA support platform extending from said base wherein said HGA support platform has a substantially planar support surface for supporting the substantially planar HGA mounting section and a recess formed in said HGA support platform configured to receive the boss extending from the surface of the HGA mounting section;

a cantilevered beam extending from said base, wherein a proximate end of said cantilevered beam is attached to said base such that a distal end of said cantilevered beam is capable of flexing with respect to said base thereby acting as a spring, said distal end of said cantilevered beam configured in a first state to contact the HGA mounting section positioned on said HGA support platform thereby holding the boss extending from the surface of the HGA mounting section against said HGA support platform recess; and a release lever extending from said distal end of said cantilevered beam, said release lever having a first position when said cantilevered beam is in said first state and a second position whereby said release lever positions said distal end of said cantilevered beam away from the HGA mounting section positioned on said HGA support platform thereby releasing the boss extending from the surface of the HGA mounting section from said HGA support platform recess.

16. A device as defined in claim 15 wherein said cantilevered beam has a serpentine shape.

17. A device as defined in claim 15 wherein said base, said HGA support platform, said cantilevered beam, and said release lever comprise a monolithic structure.

18. A device as defined in claim 15 wherein said HGA support platform recess is bound by sidewalls which slope outwardly from a surface of said substantially planar support surface towards said base thereby defining a first transverse recess dimension at said substantially planar support surface which is smaller than a second transverse recess dimension located at a position along said recess which is not at said substantially planar support surface.

19. A device as defined in claim 15 wherein said HGA support platform recess has a generally triangular transverse cross-sectional shape.

20. A device as defined in claim 15 wherein said distal end of said cantilevered beam further comprises a substantially planar clamping surface which defines an angle with respect to said substantially planar support surface of said HGA support platform.

21. A method for producing a monolitic Head/Gimbal Assembly (HGA) holder which holds an HGA having a slider attached to a distal end of a support beam and a substantially planar mounting section at a proximate end of the support beam, wherein the HGA mounting section has a boss extending from a surface of the substantially planar mounting section, said method for producing the monolitic Head/Gimbal Assembly (HGA) holder comprising:

selecting a monolithic piece of material from which the monolithic HGA holder is to be formed;

forming in the monolithic piece of material an HGA support platform extending from a base wherein the HGA support platform has a substantially planar support surface for supporting the substantially planar HGA mounting section and a recess formed in the HGA support platform configured to receive the boss extending from the surface of the HGA mounting section; and forming in the monolithic piece of material a cantilevered beam extending from the base, wherein a proximate end of the cantilevered beam is attached to the base such that a distal end of the cantilevered beam is capable of flexing with respect to the base thereby acting as a spring, wherein the distal end of the cantilevered beam is formed such that it is configured to contact the HGA mounting section which may positioned on the HGA support platform thereby holding the boss extending from the surface of the HGA mounting section against the HGA support platform recess.

22. A method as defined in claim 21 further comprising forming a release lever which extends from the distal end of the cantilevered beam, wherein the release lever is configured such that a deflection of the release lever towards the base moves the distal end of the cantilevered beam away from the HGA mounting section thereby releasing the HGA mounting section from the HGA support platform of the base.

23. A method as defined in claim 21 further comprising producing the monolitic Head/Gimbal Assembly (HGA) holder using electrical discharge machining (EDM) techniques.

* * * * *